United States Patent
Li et al.

(10) Patent No.: US 7,049,492 B1
(45) Date of Patent: May 23, 2006

(54) *THLASPI CAERULESCENS* SUBSPECIES FOR CADMIUM AND ZINC RECOVERY

(75) Inventors: Yin-Ming Li, Potomac, MD (US); Rufus L. Chaney, Beltsville, MD (US); Roger D. Reeves, Palmerston North (NZ); J. Scott Angle, Ellicott City, MD (US); Alan J. M. Baker, Melbourne (AU)

(73) Assignees: The United States of America as represented by the Secretary of Agriculture, Washington, DC (US); Massey University, Palmerston North (NZ); University of Maryland, College Park, MD (US); University of Sheffield, Sheffield (GB)

( * ) Notice: Subject to any disclaimer, the term of this patent is extended or adjusted under 35 U.S.C. 154(b) by 0 days.

(21) Appl. No.: 09/856,561

(22) PCT Filed: Nov. 23, 1999

(86) PCT No.: PCT/US99/27731

§ 371 (c)(1),
(2), (4) Date: Dec. 5, 2001

(87) PCT Pub. No.: WO00/31308

PCT Pub. Date: Jun. 2, 2000

Related U.S. Application Data

(60) Provisional application No. 60/109,427, filed on Nov. 23, 1998.

(51) Int. Cl.
*C22B 3/24* (2006.01)
*A01C 3/00* (2006.01)
*A01C 21/00* (2006.01)

(52) U.S. Cl. .................. 800/306; 800/298; 75/711; 75/712; 75/710; 210/602; 210/681; 210/682

(58) Field of Classification Search ............... 800/298, 800/306; 75/710, 711, 712; 210/602, 681, 210/682
See application file for complete search history.

(56) References Cited

U.S. PATENT DOCUMENTS

| | | | |
|---|---|---|---|
| 4,326,884 A * | 4/1982 | Soriano et al. .................. 75/1 |
| 5,320,663 A | 6/1994 | Cunningham .................. 75/432 |
| 5,364,451 A | 11/1994 | Raskin et al. .................. 75/710 |
| 5,407,817 A | 4/1995 | Lightsey et al. ............ 435/165 |
| 5,571,703 A | 11/1996 | Chieffalo et al. ............ 435/105 |
| 5,711,784 A | 1/1998 | Chaney et al. ................. 75/712 |
| 5,779,164 A | 7/1998 | Chieffalo et al. ............. 241/17 |
| 5,785,735 A | 7/1998 | Raskin et al. ................. 75/711 |
| 5,917,117 A | 6/1999 | Ensley et al. ................. 75/711 |
| 5,927,005 A | 7/1999 | Gardea-Torresdey et al. ........................... 47/58.1 |
| 5,928,406 A | 7/1999 | Salt et al. ..................... 75/712 |
| 5,944,872 A | 8/1999 | Chaney et al. ................ 75/712 |

FOREIGN PATENT DOCUMENTS

| WO | WO 98/08991 | 3/1998 |
|---|---|---|
| WO | WO 00/28093 | 5/2000 |

OTHER PUBLICATIONS

Chaney et al. Naturforsch (2005) 60c, pp. 190-198.*
Baker, A.J.M., et al., "Heavy metal accumulation and tolerance in British populations of the metallophyte *Thlaspi caerulescens* J. & C. Presl (Brassicaceae)," *New Phytol.* 127:61-68, Academic Press (1994).
Brown, S.L., et al., "Zinc and Cadmium Uptake by Hyperaccumulator *Thlaspi caerulescens* and Metal Tolerant *Silene vulgaris* Grown on Sludge-Amended Soils," *Environ. Sci. & Technol.* 29:1581-1585, American Chemical Society (1995).
Cunningham, S.D., et al., "Remediation of Contaminated Soils and Sludges by Green Plants," *Bioremediation of Inorganics, International in Situ and On-Site Bioreclamation Symposium* 3:33-54, Battelle Press (1995).
Brown, S.L., et al., "Phytoremediation Potential of *Thlaspi caerulescens* and Bladder Campion for Zinc- and Cadmium-Contaminated Soil," *J. Environ. Qual.* 23: 1151-1157, American Society of Agronomy, Crop Science Society of America, and Soil Science Society of America (1994).
Baker, A.J.M. et al., "*In Situ* Decontamination of Heavy Metal Polluted Soils Using Crops of Metal-Accumulating Plants-A Feasibility Study," in *In Situ Bioreclamation*, Olfenbuttel, R.F. and Hinchee, R.E., eds., Battelle Press, Columbus, OH, pp. 600-605 (Jan. 1991).
Baker, A.J.M. et al., "The possibility of in situ heavy metal decontamination of polluted soils using crops of metal-accumulating plants," *Resources, Conservation, and Recycling* 11:41-49, Elsevier Science B.V. (1994).

(Continued)

*Primary Examiner*—Medina A. Ibrahim
(74) *Attorney, Agent, or Firm*—Sterne, Kessler, Goldstein & Fox P.L.L.C.

(57) ABSTRACT

A cadmium and zinc hyperaccumulating subspecies from *Thlaspi caerulescense* and methods for removing or recovering cadmium and zinc from soils by cultivating the *Thlaspi caerulescense* subspecies on soils containing cadmium and zinc.

4 Claims, 2 Drawing Sheets

OTHER PUBLICATIONS

Baker, A.J.M. and Brooks, R.R., "Terrestrial Higher Plants which Hyper-accumulate Metallic Elements—A Review of their Distribution, Ecology and Phytochemistry," *Biorecovery 1*:81-126, A B Academic Publishers (1989).

Brooks, R.R. et al., "Detection Of Nickeliferous Rocks By Analysis of Herbarium Specimens Of Indicator Plants," *J. Geochem. Explor. 7*:49-57, Elsevier (1977).

Brooks, R.R. and Radford, C.C., "Nickel accumulation by European species of the *genus Alyssum*," *Proc. R. Soc. Lond. B 200*:217-224, The Royal Society (1978).

Brooks, R.R. et al., "Hyperaccumulation of nickel by *Alyssum linnaeus* (Cruciferae)," *Proc. R. Soc. Lond. B 203*:387-403, The Royal Society (1979).

Brooks, R.R., "Accumulation Of Nickel By Terrestrial Plants," in *Nickel In The Environment*, Nriagu, J.O., ed., John Wiley & Sons, New York, NY, pp. 407-430 (1980).

Brooks, R.R., et al., "Some observation on the ecology, metal uptake and nickel tolerance of *Alyssum serpyllifolium* subspecies from the Iberian peninsula," *Vegetatio 45*:183-188, Dr. W. Junk Publishers (1981).

Brooks. R.R. et al., "The chemical form and physiological function of nickel in some Iberian *Alyssum* species," *Physiol. Plant 51*:167-170, Physiologia Plantarum(1981).

Brown, S.L. et al., "Division S-4-Soil Fertility & Plant Nutrition. Zinc and Cadmium Uptake by Hyperaccumulator *Thlaspi caerulescens* Grown in Nutrient Solution," *Soil Sci. Soc. Am. J. 59*:125-133, Soil Science Society (1995).

Chaney, R.L. et al., "Phytoremediation of soil metals," *Curr. Opin. Biotech. 8*:279-284, Curremt Biology Ltd. (1997).

Cunningham, S.D. et al., "Phytoremediation of contaminated soils," *Trends Biotech. 13*:393-397, Elsevier Science Ltd. (1995).

de Varennes, A. et al., "Effects Of Heavy Metals On The Growth And Mineral Composition Of A Nickel Hyperaccumulator," *J. Plant Nutr. 19*:669-676, Marcel Dekker, Inc. (1996).

Gambi, O.V. et al., "Investigations on a nickel accumulating plant: <<0 *Alyssum bertolonii* >> Desv. I. Nickel, calcium and magnesium content and distribution during growth," *Webbia 32*:175-188, Raccolta di Scritti Botanici (1977).

Gambi, O.V. et al., "Some Aspects of the Metabolism of *Alyssum betrolonii* Desv., " in *The Vegetation of Ultramafic (Serpentine) Soils*, Proceedings of the First International Conference on Serpentine Ecology, University of California, Davis, Jun. 19-22, pp. 319-329, Intercept Ltd. (1991).

Homer, F.A. et al., "Characterization Of The Nickel-Rich Extract From The Nickel Hyperaccumulator *Dichapetalum gelonioides*," *Phytochemistry 30*:2141-2145, Pergamon Press (1991).

Homer, F.A. et al., "Comparative studies of nickel, cobalt, and copper uptake by some nickel hyperaccumulators of the genus *Alyssum*," *Plant and Soil 138*:195-205, Kluwer Academic Publishers (1991).

Ingrouille, M.J. and Smirnoff, N., "*Thlaspi caerulescens* J. & C. Presl. (*T. alpestre* L.) In Britain," *New Phytol. 102*:219-233, Academic Press (1986).

Kumar, P.B.A.N. et al., "Phytoextraction: The Use of Plants to Remove Heavy Metals from Soils," *Environ. Sci. Technol. 29*:1232-1238, American Chemical Society (1995).

Morrison, R.S. et al., "Nickel Uptake By *Alyssum* Species," *Plant Sci. Lett. 17*:451-457, Elsevier/North-Holland Scientific Publishers Ltd. (1980).

Raskin, I. et al., "Bioconcentration of heavy metals by plants," *Curr. Opin. Biotech. 5*:285-290, Current Biology Ltd. (1994).

Reeves, R.D., "The Hyperaccumulation of Nickel by Serpentine Plants," in *The Vegetation of Ultramafic (Serpentine) Soils*, Proceedings of the First International Conference on Serpentine Ecology, University of California, Davis, Jun. 19-22, pp. 253-277, Intercept Ltd. (1991).

Reeves, R.D. et al., "Uptake Of Nickel By Species of *Alyssum, Bornmuellera*, And Other Genera Of Old World Tribus Alysseae," *Taxon 32*:184-192, International Association for Plant Taxonomy (1983).

Robinson, B.H. et al., "The nickel hyperaccumulator plant *Alyssum bertolonii* as a potential agent for phytoremediation and phytomining of nickel," *J. Geochem. Explor. 59*:75-86, Elsevier (1997).

Robinson, B.H. et al., "Soil Amendments Affecting Nickel and Cobalt Uptake by *Berkheya coddii*: Potential Use for Phytomining and Phytremediation," *Annals of Botany 84*:689-694, Annals of Botany Company (1999).

Romero, F. et al., "Metal Plant And Soil Pollution Indexes," *Water, Air, and Soil Pollution 34*:347-352, D. Reidel Publishing Company (1987).

Salt, D.E. et al., "Phytoremediation: A Novel Strategy for the Removal of Toxic Metals from the Environment Using Plants," *BioTechnology 13*:468-747, Nature Publishing Company (1995).

\* cited by examiner

THLASPI CAERULESCENS SUBSPECIES FOR CADMIUM AND ZINC RECOVERY

CROSS REFERENCE TO RELATED APPLICATIONS

This application is a 371 of PCT/US99/27731 filed Nov. 23, 1999, which claims the benefit of U.S. Provisional Application No. 60/109,427, filed Nov. 23, 1998.

STATE AS TO THE RIGHTS TO INVENTIONS MADE UNDER FEDERALLY-SPONSORED RESEARCH AND DEVELOPMENT

Part of the work performed during development of this invention utilized U.S. Government funds. The U.S. Government has certain rights in this invention.

BACKGROUND OF THE INVENTION

1. Field of the Invention

The invention relates to plants that hyperaccumulate cadmium and zinc and the use thereof to recover cadmium and zinc from soil.

2. Related Art

Industrial practices such as mining, smelting, and disposing of manufacturing wastes have increased the concentration of toxic metals in the environment. For example, at many zinc mining and smelting sites, levels of zinc and cadmium in soil have become so high that few plants survive, resulting in severe disruption of local ecosystems. Once zinc and cadmium enter the soil, their removal is difficult since they are relatively immobile, and do not degrade into less toxic substances. The size of areas affected by smelter and mine wastes are usually so large that engineering methods of soil remediation, such as soil removal and replacement, are too expensive to be practical (Cunningham et al., *Trends Biotechnol.* 13:393–397 (1995)).

The ability of certain plant species to grow in metal-contaminated soil, and to actively accumulate heavy metals in their tissues, has created an interest in using such plants to extract metals from soil to recover the metals and/or to decontaminate the soil. For example, hyperaccumulators can be used to reduce the level of cadmium in rice paddies deposited from mine wastes. Prolonged consumption of rice grain produced on contaminated fields can harm human and animal health even if the cadmium concentration is low. A concentration as low as about 1.0 ppm Cd can cause harm if the rice is grown on soil with little ability to adsorb Cd. In addition, high levels of soil metals deposited by, for example, an industrial accident, can be removed using hyperaccumulators. Such removal would be economically feasible.

Growing plants, including crops, on contaminated soil to extract contaminants is referred to as phytoextraction. This method is particularly effective in arable contaminated soils because it causes little disruption or dispersal, while preserving soil fertility and landscapes.

It has long been known that certain types of soil and geological materials, including serpentine, lateritic serpentine, ultramafic and meteor-impacted soils are rich in nickel and cobalt and other metals. These soils can be conventionally mined or cultivated with metal-accumulating plants. Using plants to extract metals from such mineralized (geogenic) soils is referred to as phytomining.

*Thlaspi caerulescens* (alpine pennycress), a non-crop member of the Brassicaccae family, is zinc- and cadmium-tolerant and can accumulate exceptionally high levels of both metals in its shoot tissue. However, the usefulness of *T. caerulescens* for soil remediation is thought to be limited by its small size (about 15 cm high), slow growth rate and rosette growth habit which would make mechanical harvesting difficult. Dry weight yield over a 6-month growing season has been estimated at 5 t ha$^{-1}$ (Chaney et al., *Current Opinion in Biotech.* 8: 279–284 (1997)). Based on the results of preliminary greenhouse and field studies, the time required for phytoremediation of zinc-contaminated soils using *T. caerulescens* has been estimated to be between 13 and 28 years.

Brown et al., *Environ. Sci. Technol* 29:1581–1585 (1995), performed a 2-year field study in which *T. caerulescens*, *Silene vulgaris* (bladder campion, a zinc-tolerant non-hyperaccumulator) and lettuce were grown to maturity or for 2.5 to 4.5 months on plots which had received three different biosolids treatments at least 13 years previously. The pH of each plot was adjusted to two levels (about pH 5.0 and about pH 6.5) such that full plots existed in the field for lower and higher soil pH. Three replications of each plot were cropped for the study. The metal contents of the bio solids-treated soils were 119, 144 and 181 mg/kg Zn and 1.0, 3.0 and 5.5 mg/kg Cd, respectively. Shoot zinc concentration was highest in *T. caerulescens* with a maximum of 4440 mg/kg. The cadmium concentration of *T. caerulescens*, which reached a maximum of 28 mg/kg on the soil with the highest metal concentration and the lowest pH, was not significantly different from that of lettuce, but was higher than that of *S. vulgaris* (18 mg/kg Cd). However, the authors suggested that *S. vulgaris* may be the better choice for phytoremediation of cadmium because, although it accumulated a lower concentration of cadmium in its shoot tissue than *T. caerulescens*, the more vigorous growth of *S. vulgaris* would make it easier to establish and harvest.

Baker et al., "In situ Decontamination of Heavy Metal Polluted Soils Using Crops of Metal-accumulating Plants—A Feasibility Study," in *In Situ Bioreclamation: Applications and Investigations for Hydrocarbon and Contaminated Site Remediation*, R. F. Hinchee and R. F. Olfenbuttel (eds.), Butterworth-Heinemann, Boston, Mass., pp. 600–605 (1991), conducted a greenhouse study in which three hyperaccumulators (*Thlaspi caerulescens*, *Alyssum lesbiacum* and *Alyssum murale*) and three non-hyperaccumulators (*Brassica oleracea* (cabbage), *raphanus sativus* (radish) and *Arabidopsis thaliana*) were grown for 5 weeks on soil to which high-metal sewage sludge had been applied from 1942 to 1961, resulting in a metal content of 380 mg/kg Zn and 11 mg/kg Cd, both in excess of European (EEC) regulatory levels, i.e., 300 mg/kg Zn and 3.0 mg/kg Cd. However, the hyperaccumulator plants did not accumulate economically useful levels of metals from the contaminated soil. For example, the zinc content in *T. caerulescens* leaves was about 2000 mg/kg dry weight and the cadmium content was about 20 mg/kg dry weight.

In a field study, Baker et al., *Resources, Conservation and Recycling* 11:41–49 (1994), grew six hyperaccumulator species, including two populations of *T. caerulescens*, and three non-accumulator species, including *Brassica napus* (rapeseed) and radish, for 5–6 months on sludge-polluted soil containing 444 mg/kg Zn and 13.6 mg/kg Cd, pH 6.6. The maximum zinc concentration in the above-ground biomass of *T. caerulescens* was 6500 mg/kg. *T. caerulescens* had the highest rate of zinc removal from the soil extracting 30 kg/ha zinc.

In view of the results obtained with known zinc and cadmium hyperaccumulating plants, it would be desirable to have larger and/or more vigorous hyperaccumulator plants that could remove more metals from soil more efficiently for phytoextraction for value and for soil decontamination wherein metal recovery from the plants is not cost effective, but the process effectively removes soil contaminants. Generally, for phytoremediation and/or phytoextraction, the soil contains greater than about 1.0 ppm to about 10,000 ppm Cd and/or greater than about 300 ppm to about 100,000–150,000 ppm Zn.

SUMMARY OF THE INVENTION

Accordingly, this invention relates to zinc and cadmium hyperaccumulating plants and systems for recovering metals such as zinc and cadmium using phytoextracting techniques.

A preferred method of recovering cadmium and/or zinc from soil containing cadmium and/or zinc comprises cultivating at least one *T. caerulescens* plant that accumulates cadmium and zinc in above-ground tissues and optionally recovering the cadmium and/or zinc produced.

In a preferred embodiment, the at least one *T. caerulescens* plant accumulates from about 0.01% (100 mg/kg) to about 0.6% (6000 mg/kg) cadmium in above-ground tissues on a dry weight basis and/or from about 0.5% (5000 mg/kg) to about 3.0% (30,000 mg/kg) zinc in above-ground tissues on a dry weight basis.

In more preferred embodiment, the at least one *Thlaspi caerulescens* plant accumulates from about 1000 to about 6000 mg cadmium/kg above-ground tissues on a dry weight basis and/or from about 15,000 to about 30,000 mg zinc/kg above-ground tissues on a dry weight basis.

In one embodiment, the at least one *T. caerulescens* plant is harvested as biomass material after accumulation of the metals and the metals are recovered from the biomass material.

In another embodiment, the metals are recovered by drying and combusting the harvested biomass material to oxidize and vaporize organic material present.

In another embodiment, the metals are recovered from the harvested biomass material by incineration and reduction to ash with energy recovery to produce a cadmium- and/or zinc-containing ore.

In another embodiment, the soil is acidified or at least one chloride salt is added to the soil prior to the cultivation of the at least one *T. caerulescens* plant.

The invention further relates to a method of decontaminating soil containing cadmium and/or zinc, comprising cultivating at least one *Thlaspi caerulescens* plant that accumulates from about 100 to about 6000 mg cadmium/kg above-ground tissues on a dry weight basis and/or from about 5000 to about 30,000 mg zinc/kg above-ground tissues on a dry weight basis under conditions sufficient to permit the at least one *Thlaspi caerulescens* plant to accumulate such amounts of cadmium and/or zinc.

The invention further relates to an isolated *Thlaspi caerulescens* plant cultivated on cadmium- and/or zinc-containing soil that accumulates cadmium in above-ground tissue at a concentration of from about 100 mg/kg dry weight of the tissue to about 6000 mg/kg dry weight of the tissue and/or accumulates zinc in above-ground tissue at concentration of from about 5000 mg/kg dry weight of the tissue to about 30,000 mg/kg dry weight of the tissue.

The invention further relates to pollen of the *Thlaspi caerulescens* plant.

The invention further relates to plant having all the physiological and morphological characteristics of the *Thlaspi caerulescens* plant.

The invention further relates to propagation material of the *Thlaspi caerulescens* plant.

In preferred embodiment, the isolated *Thlaspi caerulescens* plant is *T. caerulescens* G15.

The invention further relates to cultivated *Thlaspi caerulescens* G15, the seeds of which have been deposited under ATCC Accession No. 203439.

DETAILED DESCRIPTION OF THE PREFERRED EMBODIMENTS

In the present invention, it was discovered that certain metals can be selectively recovered from metal-rich soil using phytoextracting techniques employing plants classified as metal-hyperaccumulators. By cultivating selected plants on metal-rich soil, a high concentration of the metals absorbed by the roots is translocated to above-ground tissues, such as the stems, leaves, flowers and other leaf and stem tissues. This facilitates recovery of the metal extracted from the soil such that land contaminated with the metals can be reclaimed and the metals optionally harvested.

In one embodiment, cadmium and/or zinc are recovered from soil containing cadmium and/or zinc by cultivating at least one *T. caerulescens* plant that accumulates cadmium and/or zinc in above-ground tissues and recovering the cadmium and/or zinc produced.

In a preferred embodiment for soil remediation, the at least one *T. caerulescens* plant accumulates from about 0.01% (about 100 mg/kg) to about 0.6% (6000 mg/kg) cadmium in above-ground tissues on a dry weight basis and/or from about 0.5% (5000 mg/kg) to about 3.0% (30,000 mg/kg) zinc in above-ground tissues on a dry weight basis.

In preferred embodiment for metal recovery, the at least one *T. caerulescens* plant accumulates from about 0.1% (1000 mg/kg) to about 0.6% (6000 mg/kg) cadmium in above-ground tissues on a dry weight basis, and/or from about 1.5% (about 15,000 mg/kg) to about 3.0% (30,000 mg/kg) zinc in above-ground tissues on a dry weight basis.

Figure 1:
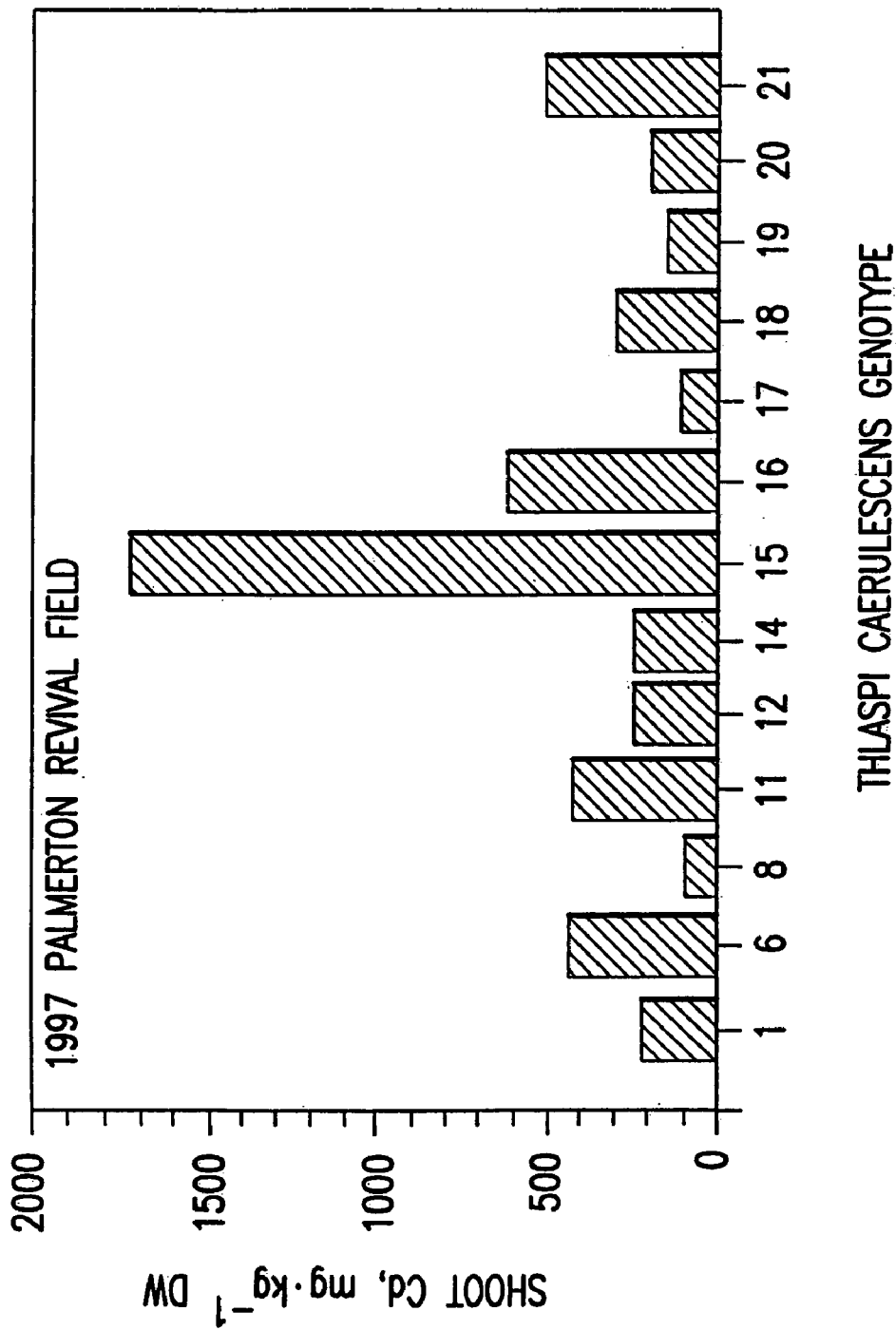
FIG. 1 illustrates the genotypic difference in cadmium-uptake in plant shoots.
Figure 2:
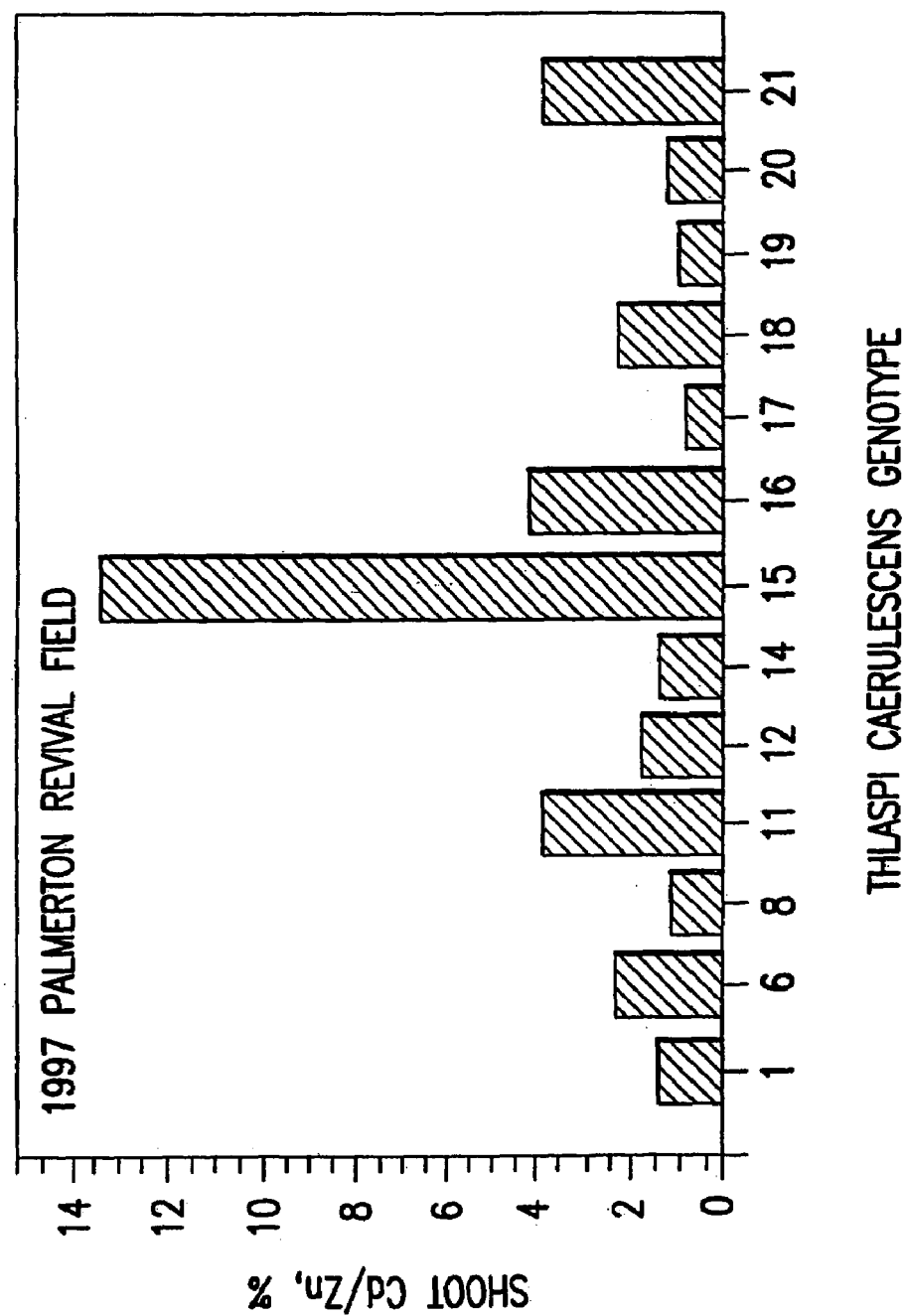
FIG. 2 is a plot showing the Cd:Zn ratio in shoots of several *T. caerulescens* genotypes harvested from zinc and cadmium contaminated soils.

In a more preferred embodiment, the hyperaccumulator is *T. caerulescens* G15, a subspecies of *T. caerulescens*, which accumulates much more cadmium than other zinc-accumulators or other *T. caerulescens* subspecies (FIG. 2). Specifically, this subspecies has the ability to accumulate at least about 1000 mg/kg Cd dry shoots and at least about 18,000 mg/kg Zn dry shoots (FIG. 1).

After cultivation, the hyperaccumulator plant may be harvested in a conventional fashion, i.e., by cutting the plant at soil level. The harvested materials may then be left to dry in much the same fashion that alfalfa is dried, so as to remove most of the water present in the plant tissue. After drying, the plant tissue may be collected from the field by normal agricultural practices of hay-making, incinerated and reduced to an ash with or without energy recovery. Alternatively, the dried plant material may be hydrolyzed with concentrated acid to produce sugars and the metals recovered according to U.S. Pat. Nos. 5,407,817, 5,571,703 and 5,779,164. The sugars may then be fermented to produce ethanol.

As an alternative, the temperature of the off gas from the incinerator could be monitored such that Cd and Zn metals in gaseous form are condensed from the hot gasses separately from the bulk of the ash components which would condense at a higher temperature or lower temperature in a manner similar to distilling liquids and recovering different fractions at different temperatures. With normal ores, this is not possible in the first processing step at a smelter. But with phytoextraction plant incineration, the distillation would most likely be effective during the burning and power production.

As another alternative, the resulting dried plant material may be further treated by known roasting, sintering or smelting methods which allow the metals in the ash or ore to be recovered according to conventional metal refining methods such as acid dissolution and electrowinning.

Conventional smelting, roasting and sintering temperatures from about 260° C. to about 1000° C. are sufficient to combust the dried plant material to oxidize and vaporize the organic material present. This leaves a residue of the accumulated metal with few contaminants known to interfere with metal refining. Further, it is expected that the concentration of other components in the ash, such as lead, will be lower than with conventional mined ore concentrates.

In a preferred embodiment, the plant tissue is collected, incinerated and reduced to ash with energy recovery. The elements in the ash of *T. caerulescens* cause little interference with the recovery of Zn and Cd from the ash. The result is plant ash of a high grade ore.

In an evaluation of the utility of *T. caerulescens* in phytoextracting zinc and cadmium, an initial lab study was conducted wherein twenty genotypes of *T. caerulescens* were collected from different contaminated sites. For twelve weeks, the collected plants were evaluated in a nutrient solution system treated with high concentrations of zinc and cadmium (2000 mM Zn, 40 mM Cd) and low concentrations of zinc and cadmium (3.16 mM Zn, 0.063 mM Cd). The nutrient solution system was half-strength Hoagland Solution which contains a selective ferric chelating agent to keep the Fe soluble in the presence of the Zn and Cd. Significant differences were found among the twenty genotypes tested for shoot zinc and cadmium concentrations, plant Cd:Zn ratio and shoot biomass, i.e., shoot yield. Several genotypes tested had a low tolerance for the high concentrations of zinc and cadmium. It was found that zinc and cadmium accumulation in shoots varied widely, ranging from about 20,600 to about 44,700 mg/kg Zn dry shoots, and about 625 to about 5510 mg/kg Cd dry shoots. The shoot Cd:Zn ratio (division of the Cd concentration by the Zn concentration on a mass basis) among the genotypes varied from about 3.0 to about 22%.

Several of the genotypes of *T. caerulescens* were subsequently tested at a zinc smelting site in Palmerton, Pa., where zinc smelting has occurred for eighty years causing extensive contamination of soils in the community adjacent to the smelter. This study of the selected *T. caerulescens* genotype group confirmed a wide range of zinc tolerance and a wide range of Cd:Zn ratios in shoots obtained from different *T. caerulescens* genotypes. As can be seen from FIGS. 1 and 2, remarkable variations in cadmium accumulation and Cd:Zn ratio were observed. Additionally, it was found that lower soil pH favored zinc and cadmium accumulation in shoots. Further, although the "Pray on" genotype (G18) performed well with about 20 g/kg Zn dry shoots and about 200 mg/kg Cd dry shoots, one of the high Cd:Zn ratio genotypes, *T. caerulescens* G15, accumulated about 1800 mg/kg Cd dry shoots and about 18 g/kg Zn dry shoots.

In general, when soils contain both Cd and Zn, soil Cd will be about 0.5 to about 2.0% of soil Zn. For example, soils with about 150,000 ppm (about 15%) Zn will often not contain more than about 3000 ppm (about 0.3%) Cd. Thus, if the shoot yield is about 2.5% Zn, then the highest Cd one could hope to recover with genotypes used in most research in *Thlaspi* would be about 0.025%, provided the soil has typical Cd and Zn levels. However, G15 can reach 0.6% mg/kg Cd without plant injury since Genotype G15 has the ability to accumulate additional Cd per unit Zn. Seeds of *T. caerulescens* G15 were deposited on Nov. 6, 1998, under the provisions of the Budapest treaty at the American Type Culture Collection, 10801 University Blvd., Manassas, Va. 20110-2209, and assigned ATCC Accession No. 203439.

The study supports the fact that metal-accumulators with Cd:Zn ratios of greater than 0.05, i.e., about 5.0%, recover cadmium from soil faster than accumulators with ratios of less than 0.05. The higher cadmium-accumulating genotypes are useful for rapid phytoremediation of cadmium-contaminated soil which causes adverse health effects in subsistence consumers of rice or tobacco grown on contaminated soils as described above.

Although *T. caerulescens* G15 is capable of hyperaccumulating zinc and cadmium in its above-ground plant tissues, fertilizer for growth and/or weed control, particularly in polluted soil, can be used to increase hyperaccumulation because, inter alia, the ability of *T. caerulescens* to grow well increases when plant competition is limited by weed control. Preferred fertilizers are ammonium-containing or ammonium-generating fertilizers. The use of fertilizers per se is well-known, and acceptable fertilizers and protocols can be readily determined with no more than routine experimentation, by those of ordinary skill in the art. Normal soil test values for P (required for the growth of all plants), K, Ca and Mg used in farming and gardening will allow the skilled artisan to obtain the needed information regarding fertilization for growing *T. caerulescens* plants.

In addition to using fertilizers, soil acidification can increase uptake of zinc and cadmium as indicated above. When soil contains at or near regulatory Zn and Cd limits, the pH can be reduced to about 4.5 to about 6.5 to maximize metal uptake. At very acidic pHs, the Al and Mn present in the soil become soluble which in turn reduces plant yield. When the soil is particularly high in Zn and Cd, then the pH must be raised to insure plant survival. The soil pH can be raised to as high as about 9.0. Thus, the preferred soil pH ranges from about 4.5 to about 9.0.

To acidify the soil, acids such as organic and inorganic acids can be used. Examples of such organic and inorganic acids include acetic acid, aqueous hydrogen chloride, aqueous sulfuric acid and the like. In a preferred embodiment, inorganic sulfur is used to reduce the soil pH. Inorganic sulfur is oxidized by soil microbes to generate sulfuric acid within the soil. If the soil pH is too low, then bases such as limestone or dolomitic limestone, lime or dolomitic lime, hydrated lime or dolomitic hydrated lime or byproducts thereof that contain a calcium carbonate equivalent or mixtures thereof could be used to raise the soil pH. The concentration of acid or base to add to the soil will depend upon the initial soil pH, the desired final soil pH and the soil properties. One of ordinary skill in the art would be able to readily determine the appropriate concentration of acid or base necessary using common soil analysis methods well-known in the art.

Table 1 shows the effect of fertilizer and acidification treatments on zinc, cadmium and lead accumulation in *T. caerulescens* and in a 1993 crop of lettuce. The initial condition of the soil was highly calcareous with 25 mg/kg Cd, 475 mg/kg Zn and 155 mg/kg Pb. The soil at the test field had become metal enriched by application of ash from a sewage sludge incinerator during a period when the sludge from St. Paul, Minn., was highly contaminated with cadmium from a Cd—Ni battery manufacturer. Lime was used to dewater the sludge, however, it prevented the sulfur treatment from acidifying the soil as much as had been expected. The very low concentration of lead in the plants confirmed the experience of most researchers that lead hyperaccumulation is not likely to be possible when adequate phosphorus is provided. Phosphorus inhibits lead translocation from roots to shoots and thus, lead uptake. This inhibition is caused by insoluble lead-phosphates that form in the soil or in the root cells. Further, the manipulation of phosphorus is unlikely to affect Zn or Cd phytoextraction.

Table 1. Effect of Sulfur (S) and Nitrogen Fertilizer (N) Treatments on Metal Accumulation in Shoots of *Thlaspi caerulescens* and Lettuce on Revival Field, St. Paul, Minn.

| Treatments | | Soil | Metals in Thlaspi | | | Metals in Lettuce | | |
|---|---|---|---|---|---|---|---|---|
| S | N | pH | Cd | Zn | Pb | Cd | Zn | Pb |
| | | | mg/kg dry weight | | | | | |
| 0 | NH$_4$ | 7.4 | 9.6 | 1360 | 0.5 | 5.3 | 58 | 0.8 |
| 0 | NO$_3$ | 7.5 | 9.4 | 1260 | 4.6 | 4.5 | 64 | 0.8 |
| 1 | NH$_4$ | 6.7 | 11.7 | 3100 | 1.9 | 7.8 | 86 | 2.1 |
| 1 | NO$_3$ | 6.8 | 8.0 | 2060 | 1.5 | 7.5 | 77 | 1.7 |

Normal fertilizer levels of nitrogen were added to the soil in two chemical forms because the pH near the roots is lowered by the addition of ammonium-N and raised by the addition of nitrate-N. Sulfur was added because the soil contained a lot of free limestone equivalent. The amount of sulfur added was sufficient to significantly lower the pH without killing the plants with Zn, Cd, Mn or Al toxicity. Specifically, 14.5 t/ha of sulfur were added.

Another possible additive for contaminated soil is a metal chelating agent. Metal chelates are commonly used in agriculture and occur naturally in living cells. The addition of chelating agents, such as nitrolotriacetic acid (NTA), ethylenediaminetetraacetic acid (EDTA), ethyleneglycol-bis-(p-aminoethylether-N, N-tetraacetic acid) or any of a variety of amino-acetic acids known to those of ordinary skill in the art as chelating agents, to the soil improves the movement of soil metals to root surfaces for uptake and translocation into above-ground tissues. Preferred chelating agents are NTA or EDTA. Typically, chelating agents are added at a concentration ranging from about 50 kg/ha to about 3000 kg/ha after the plants are established. As with the use of fertilizers, the optimum concentration of chelating agents can be readily determined with no more than routine experimentation. For example, if EDTA is preferably 10 millimoles/kg soil, then the amount added would be 2.92 kg EDTA/t or 2.92 t EDTA/ha since EDTA acid is 292 mg/millimole and one would need to add 2.92 g EDTA/kg soil to achieve 10 millimoles EDTA/kg soil.

An alternative which improves Cd uptake, but has little effect on Zn uptake, is the addition of a chloride salt that liberates free chloride ion in soil. However, NaCl repeatedly added to soil may harm the soil. Chloride forms a complex with Cd (inorganic monochloro-Cd and dichloro-Cd—Cd at levels of chloride tolerated by plants) which increases the rate of diffusion of Cd to the root and causes Cd to leak into the root. Preferred concentrations of chloride result in a soil solution containing about 10 to about 200 millimoles of chloride per liter (about 10 to about 200 mM). At the high end, chloride will be toxic to even *Thlaspi* plants, but Cd removal will increase.

This invention has been described in specific detail with regard to plants and methods for increasing cadmium and zinc uptake via phytoextraction. Except where necessary for operability, no limitation to these specific materials is intended nor should such a limitation be imposed on the claims appended hereto.

From the foregoing description, one skilled in the art can easily ascertain the essential characteristics of this invention, and without departing from the spirit and scope thereof, can make various changes and modifications of the invention to adapt it to various usages and conditions without undue experimentation. All patents, patent applications and publications cited herein are incorporated by reference in their entirety.

What is claimed is:

1. A method of recovering cadmium and/or zinc from arable soil containing cadmium and/or zinc, comprising:
   (a) cultivating in said arable soil at least one *Thlaspi caerulescens* plant that accumulates from about 1000 to about 2600 mg cadmium/kg in above-ground tissues on dry weight basis and/or from about 15,000 to about 26,000 mg zinc/kg in above—ground tissues on dry weight basis under conditions sufficient to permit said at least one *Thlaspi caerulescens* plant to accumulate such amounts of cadmium and/or zinc; and
   (b) recovering the accumulated cadmium and/or zinc; wherein said at least one *Thlaspi caerulescens* plant is *Thlaspi caerulescens* genotype G15, seed of which have been deposited under ATCC Accession No: 203439.

2. An isolated *Thlaspi caerulescens* plant cultivated on arable soil containing cadmium and/or zinc, said plant accumulates in above-ground tissues cadmium at a concentration of from about 100 mg/kg to about 6000 mg/kg dry weight of said tissues and/or zinc at a concentration of from about 5000 mg/kg to about 30,000 mg/kg dry weight of said tissues, wherein said plant is *Thlaspi caerulescens* genotype G15, seed of which have been deposited under ATCC Accession No: 203439.

3. A *Thlaspi caerulescens* G15 seed as deposited with the ATCC having Accession No: 203439.

4. Cultivated *Thlaspi caerulescens* genotype G15, seed of which have been deposited under ATCC Accession No: 203439.

* * * * *